US012078078B2

(12) United States Patent
Trudeau et al.

(10) Patent No.: US 12,078,078 B2
(45) Date of Patent: Sep. 3, 2024

(54) CYLINDER HEAD WITH INTEGRATED TURBOCHARGER

(71) Applicant: FCA US LLC, Auburn Hills, MI (US)

(72) Inventors: Douglas Trudeau, Lake Orion, MI (US); Michael P Schmidt, Highland, MI (US); Philip J Insalaco, Denton, MI (US); Brian Jacobs, Macomb, MI (US); Phillip Bunker, Southfield, MI (US); Matthew T Barker, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/953,514

(22) Filed: Sep. 27, 2022

(65) Prior Publication Data

US 2023/0032347 A1 Feb. 2, 2023

Related U.S. Application Data

(60) Provisional application No. 63/252,748, filed on Oct. 6, 2021.

(51) Int. Cl.

*F01D 25/24* (2006.01)
*F01D 9/02* (2006.01)
*F02F 1/24* (2006.01)

(52) U.S. Cl.

CPC .......... *F01D 25/243* (2013.01); *F01D 9/026* (2013.01); *F02F 1/24* (2013.01); *F05D 2220/40* (2013.01);

(Continued)

(58) Field of Classification Search

CPC .......... F01D 25/243; F01D 9/026; F02F 1/24; F02F 1/243; F05D 2220/40;

(Continued)

(56) References Cited

U.S. PATENT DOCUMENTS 7,784,442 B2 8/2010 Lester et al.
8,459,024 B2 6/2013 Koch (Continued)

FOREIGN PATENT DOCUMENTS

EP 2143925 A1 1/2010
EP 2392794 A1 12/2011
JP 2006063851 A 3/2006

*Primary Examiner* — Yi-Kai Wang
(74) *Attorney, Agent, or Firm* — Jeremy J. Klobucar

(57) ABSTRACT

A cylinder head assembly for an internal combustion engine includes a cast cylinder head, a turbocharger housing including a compressor housing and turbine housing integrally cast with the cylinder head, and a turbocharger cartridge assembly configured to be inserted into the turbocharger housing and including a shaft coupled between a compressor wheel and a turbine wheel. A compressor cover is configured to couple to the compressor housing and define a compressor inlet and at least partially define a compressor diffuser passage. The cartridge assembly includes a housing having a diffuser flange extending outwardly therefrom, the diffuser flange including a front surface and an opposite contoured volute surface. The compressor diffuser passage is at least partially defined by the compressor cover and the diffuser flange front surface. A compressor volute is at least partially defined by the diffuser flange contoured volute surface and a contoured inner surface of the compressor housing.

12 Claims, 6 Drawing Sheets

(52) U.S. Cl.
CPC ...... *F05D 2230/21* (2013.01); *F05D 2240/14* (2013.01); *F05D 2240/15* (2013.01); *F05D 2250/14* (2013.01); *F05D 2260/98* (2013.01)

(58) Field of Classification Search
CPC ............. F05D 2230/21; F05D 2240/14; F05D 2240/15; F05D 2260/98
USPC ....................................................... 123/193.5
See application file for complete search history.

(56) References Cited

U.S. PATENT DOCUMENTS

| | | | |
|---|---|---|---|
| 8,555,825 | B2 | 10/2013 | Lenz et al. |
| 8,621,865 | B2 | 1/2014 | Mehring et al. |
| 8,875,670 | B2 | 11/2014 | Brewer et al. |
| 8,955,318 | B2 | 2/2015 | Marques et al. |
| 8,959,913 | B2 | 2/2015 | Nagurney et al. |
| 8,966,894 | B2 | 3/2015 | Marques et al. |
| 8,984,880 | B2 | 3/2015 | Marques et al. |
| 9,091,200 | B2 | 7/2015 | Lombard et al. |
| 9,194,282 | B2 | 11/2015 | Serres et al. |
| 9,683,482 | B2 | 6/2017 | Fäth et al. |
| 9,926,941 | B2 | 3/2018 | Santosh et al. |
| 10,487,726 | B2 | 11/2019 | Wood et al. |
| 2011/0302920 | A1* | 12/2011 | Cuniberti ................ F01D 25/14 60/605.3 |
| 2012/0011845 | A1 | 1/2012 | Williams et al. |
| 2012/0192557 | A1 | 8/2012 | Johnson et al. |
| 2013/0055713 | A1 | 3/2013 | Drangel et al. |
| 2013/0287564 | A1 | 10/2013 | Fäth et al. |
| 2014/0165556 | A1 | 6/2014 | Plagens et al. |
| 2014/0326215 | A1 | 11/2014 | Haefner et al. |
| 2020/0347773 | A1 | 11/2020 | Schmidt et al. |
| 2020/0347796 | A1 | 11/2020 | Schmidt et al. |
| 2021/0010412 | A1 | 1/2021 | Schmidt et al. |
| 2022/0112818 | A1* | 4/2022 | Marques ............... F04D 29/584 |

* cited by examiner

CYLINDER HEAD WITH INTEGRATED TURBOCHARGER

CROSS REFERENCE TO RELATED APPLICATION

This application claims the benefit of U.S. Provisional Pat. App. No. 63/252,748, filed Oct. 6, 2021, the contents of which are incorporated herein by reference thereto.

FIELD

The present application relates generally to internal combustion engines having a turbocharger and, more particularly, to an internal combustion engine having a cylinder head with an integrated turbocharger.

BACKGROUND

Turbocharger systems typically account for a good portion of the cost of an engine. Moreover, typical gasoline engine turbine housings have significant amounts of nickel and chrome, thereby accounting for a large portion of the cost of the turbocharger. Further, gaskets, fasteners, mating tubes, ducts and other components associated with the turbocharger often need to be made of premium materials, for example, due to heat, pressure, and vibration induced from the turbocharger. While such turbocharger systems do work well for their intended purpose, it is desirable to provide continuous improvement in the relevant art by reducing cost and complexity.

SUMMARY

In accordance with one example aspect of the invention, a cylinder head assembly for an internal combustion engine is provided. In one example implementation, the assembly includes a cast cylinder head, a turbocharger housing, including a compressor housing and turbine housing, integrally cast with the cylinder head, and a turbocharger cartridge assembly configured to be inserted into the turbocharger housing and including a shaft coupled between a compressor wheel and a turbine wheel. A compressor cover is configured to couple to the compressor housing and define a compressor inlet and at least partially define a compressor diffuser passage. The cartridge assembly includes a housing having a diffuser flange extending outwardly therefrom, the diffuser flange including a front surface and an opposite contoured volute surface. The compressor diffuser passage is at least partially defined by the compressor cover and the diffuser flange front surface. A compressor volute is at least partially defined by the diffuser flange contoured volute surface and a contoured inner surface of the compressor housing.

In addition to the foregoing, the described assembly may include one or more of the following features: wherein the compressor cover includes an insert end opposite the compressor inlet, the insert end including a hub with a backing flange, wherein the hub is received within an inlet opening formed in the compressor housing such that an outer surface of the hub is seated against an inner surface of the inlet opening, wherein an inner surface of the backing flange is seated against a front face of the compressor housing, wherein a recess is formed in at least one of the hub outer surface and the backing flange inner surface, and wherein a seal is disposed in the recess to radially and/or axially seal the compressor cover to the compressor housing to thereby at least partially enclose the compressor diffuser passage.

In addition to the foregoing, the described assembly may include one or more of the following features: wherein the compressor volute has a cross-sectional shape that is squashed compared to a conventional D-shaped or O-shaped volute cross-sections, the cross-sectional shape having an oblong shape that is elongated in a radial direction and shortened in an axial direction to thereby enable a shorter length of the turbocharger housing; wherein the turbocharger housing further comprises a cartridge bore configured to receive the cartridge assembly, and a straight oil drain passage in fluid communication with the cartridge bore and configured to receive lubricant from the cartridge assembly, wherein the straight oil drain passage is oriented perpendicular to a rotational axis of the shaft to provide a straight line of sight for a leak checking device.

In addition to the foregoing, the described assembly may include one or more of the following features: wherein the cartridge assembly further comprises the housing having a first seal groove and a second seal groove, a first seal disposed in the first seal groove and configured to provide a seal between the cartridge assembly housing and the turbocharger housing, and a second seal disposed in the second seal groove and configured to provide a seal between the cartridge assembly housing and the turbocharger housing, wherein the second seal has a diameter smaller than the first seal to enable the second seal to pass over an oil drain passage during installation of the cartridge assembly into the turbocharger housing.

In addition to the foregoing, the described assembly may include one or more of the following features: wherein the cartridge assembly further comprises one or more apertures formed through the diffuser flange and configured to receive a fastener for coupling the cartridge assembly to the turbocharger housing, wherein the one or more apertures each include a counterbore formed with an undercut that provides a grab ledge, and wherein an automated tool can be inserted into the one or more apertures and hook onto the grab ledge to facilitate installation and/or removal of the cartridge assembly.

In addition to the foregoing, the described assembly may include one or more of the following features: a heat shield configured to be fitted to a turbine side of the cartridge assembly, and a part-in-assembly rigid exhaust seal disposed between the cartridge assembly and the heat shield, wherein when the cartridge assembly is coupled to the turbocharger housing the rigid exhaust seal is configured to be at least partially crushed to establish a seal between the heat shield and the cartridge assembly to prevent exhaust gas from reaching radial seals of the cartridge assembly; and an oil passage integrally cast in the cylinder head and turbocharger housing, the oil passage configured to drain lubricant from the turbocharger housing and direct the lubricant to the cylinder head for return to a cylinder block without any external oil drain tubes.

In addition to the foregoing, the described assembly may include one or more of the following features: a wastegate valve assembly having a bushing configured to be received within a bore formed in the turbocharger housing, a valve shaft received within the bushing, an Oldham coupling operably coupled to the valve shaft, a cup spring disposed about the valve shaft to facilitate preventing emissions leakage through a clearance between the valve shaft and the bushing, and a wear washer disposed about the valve shaft between the cup spring and the Oldham coupling to facilitate preventing concentrated wear of the Oldham coupling; a wastegate valve actuator assembly operably coupled to the Oldham coupling to selectively move a wastegate valve between open and closed positions; and wherein the wastegate valve actuator assembly includes a direct drive motor having an output shaft coupled to the shaft of the wastegate valve.

In accordance with another example aspect of the invention, a cylinder head assembly for an internal combustion engine is provided. In one example implementation, the assembly includes a cast cylinder head, and a turbocharger housing, including a compressor housing and turbine housing, integrally cast with the cylinder head. A turbocharger cartridge assembly is configured to be inserted into the turbocharger housing and includes a shaft coupled between a compressor wheel and a turbine wheel. A compressor cover is configured to couple to the compressor housing and including a compressor inlet and an opposite insert end with a hub and a backing flange, wherein a recess is formed in the hub and/or the backing flange to receive a first seal to radially and/or axially seal the compressor cover to the compressor housing.

The cartridge assembly includes a housing having a diffuser flange extending outwardly therefrom, the diffuser flange including a front surface and an opposite contoured volute surface. The compressor diffuser passage is at least partially defined by the compressor cover and the diffuser flange front surface. A compressor volute is at least partially defined by the diffuser flange contoured volute surface and a contoured inner surface of the compressor housing. The compressor volute has a cross-sectional shape that is squashed compared to a conventional D-shaped or O-shaped volute cross-sections, the cross-sectional shape having an oblong shape that is elongated in a radial direction and shortened in an axial direction to thereby enable a shorter length of the turbocharger housing.

A straight oil drain passage is in fluid communication with a cartridge bore of the turbocharger housing and configured to receive lubricant from the cartridge assembly. The straight oil drain passage is oriented perpendicular to a rotational axis of the shaft to provide a straight line of sight for a leak checking device. A first seal groove and a second seal groove are formed in the cartridge assembly housing. A second seal is disposed in the first seal groove and configured to provide a seal between the cartridge assembly housing and the turbocharger housing. A third seal is disposed in the second seal groove and configured to provide a seal between the cartridge assembly housing and the turbocharger housing. The third seal has a diameter smaller than the second seal to enable the second seal to pass over an oil drain passage during installation of the cartridge assembly into the turbocharger housing.

The cartridge assembly further includes one or more apertures formed through the diffuser flange configured to receive a fastener for coupling the cartridge assembly to the turbocharger housing. The one or more apertures each include a counterbore formed with an undercut that provides a grab ledge. An automated tool can be inserted into the one or more apertures and hook onto the grab ledge to facilitate installation and/or removal of the cartridge assembly.

A heat shield is configured to be fitted to a turbine side of the cartridge assembly, and a part-in-assembly rigid exhaust seal is disposed between the cartridge assembly and the heat shield. When the cartridge assembly is coupled to the turbocharger housing the rigid exhaust seal is configured to be at least partially crushed to establish a seal between the heat shield and the cartridge assembly to prevent exhaust gas from reaching radial seals of the cartridge assembly. An oil passage is integrally cast in the cylinder head and turbocharger housing. The oil passage is configured to drain lubricant from the turbocharger housing and direct the lubricant to the cylinder head for return to a cylinder block without any external oil drain tubes.

A wastegate valve assembly includes a bushing configured to be received within a bore formed in the turbocharger housing, a valve shaft received within the bushing, and an Oldham coupling operably coupled to the valve shaft. A cup spring is disposed about the valve shaft to facilitate preventing emissions leakage through a clearance between the valve shaft and the bushing. A wear washer is disposed about the valve shaft between the cup spring and the Oldham coupling to facilitate preventing concentrated wear of the Oldham coupling.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Described herein are systems and methods for integrally casting features or components into the cylinder head of an internal combustion engine. Typically, an internal combustion engine is a compact mix of hardware often required to fit in very tight underhood spaces. When components with high mass and density, such as turbocharger systems, are bolted externally to an engine, the resulting structure can potentially affect NVH, dynamics, packaging, decking, durability, etc.

In order to reduce or prevent such issues in the present disclosure, the turbocharger housing is integrated (e.g., cast) into an aluminum cylinder head, which is advantageously configured to reduce engine cost, improve packaging, simplify assembly, reduce number of assembly steps, improve catalyst light off emissions, reduce turbocharger noise (e.g., wastegate resonances, flow noise, rotor group unbalance whine, etc.), improve engine warm up, and improve fuel economy.

Additionally, unlike conventional turbochargers that bolt onto a cylinder head, the described design integrates both the compressor housing and the turbine housing into the cylinder head casting, including the compressor and turbine volutes. Moreover, the disclosed system integrates the entire wastegate system, compressor inlet/outlet, and the turbine inlet/outlet into the cylinder head. As such, no additional heat shields are required.

In some examples of the present disclosure, the systems described herein provide an integrally cast cylinder head turbocharger housing that includes (i) a compressor cover with radial, axial, or radial-axial sealing arrangements, (ii) a cartridge assembly diffuser flange with a volute contour, (iii) a narrowed/squashed compressor volute, (iv) a straight oil drain passage oriented perpendicular to a turbocharger shaft axis, (v) radially offset cartridge assembly seals, (vi) undercut bolt counterbores to assist automated cartridge assembly install/removal, (vii) a part-in-assembly (PIA) exhaust seal to the cartridge assembly, (viii) an integrated oil drain passage, and (ix) a reduced wear wastegate actuator coupling.

Figure 1:
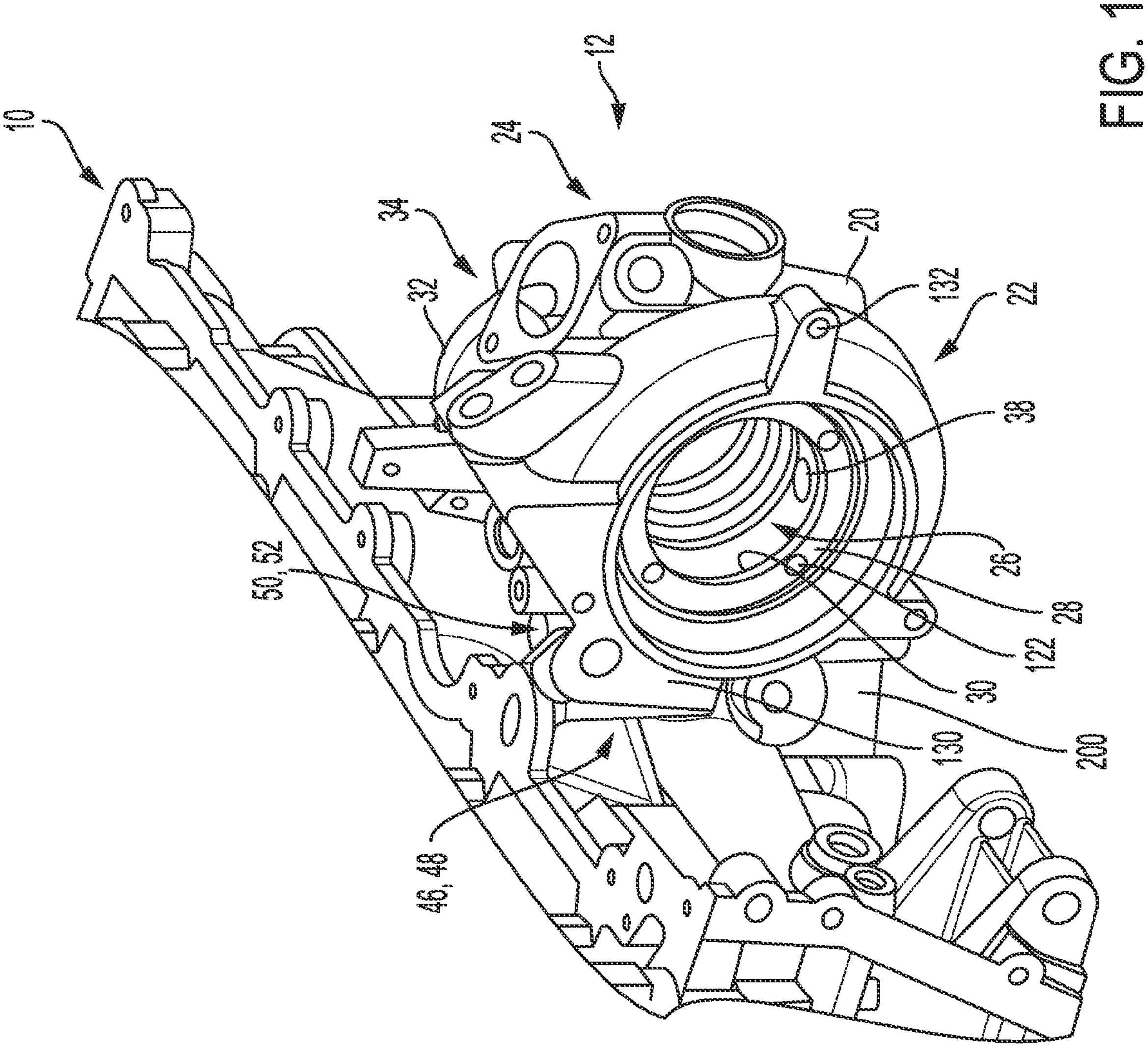
FIG. 1 is a perspective view of an example cylinder head casting with an integrally cast turbocharger housing in accordance with the principles of the present application.
Figure 2:
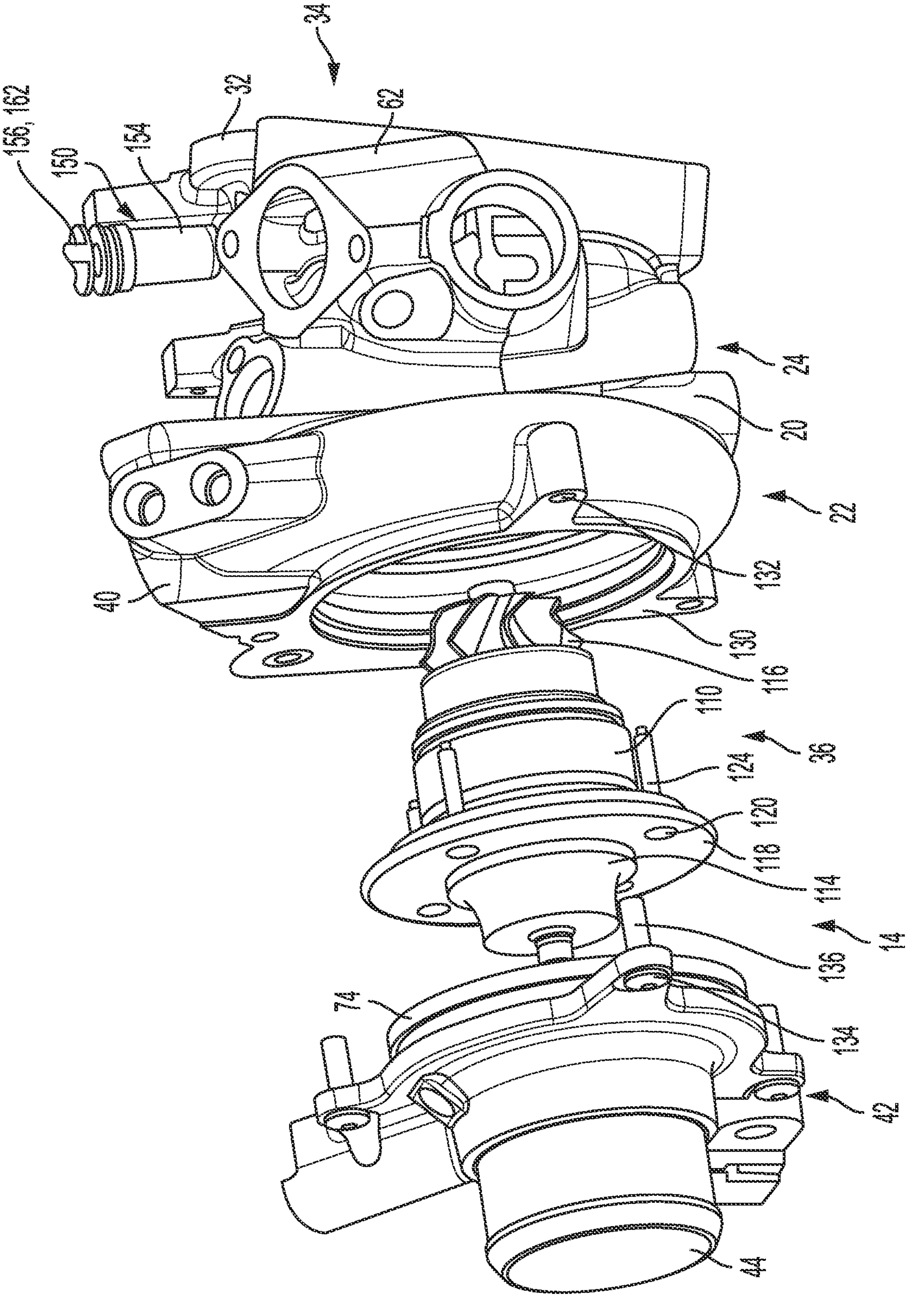
FIG. 2 is an exploded view of the cylinder head of FIG. 1 with various turbocharger assembly components to be assembled on the integrated turbocharger housing, in accordance with the principles of the present application.
Figure 3:
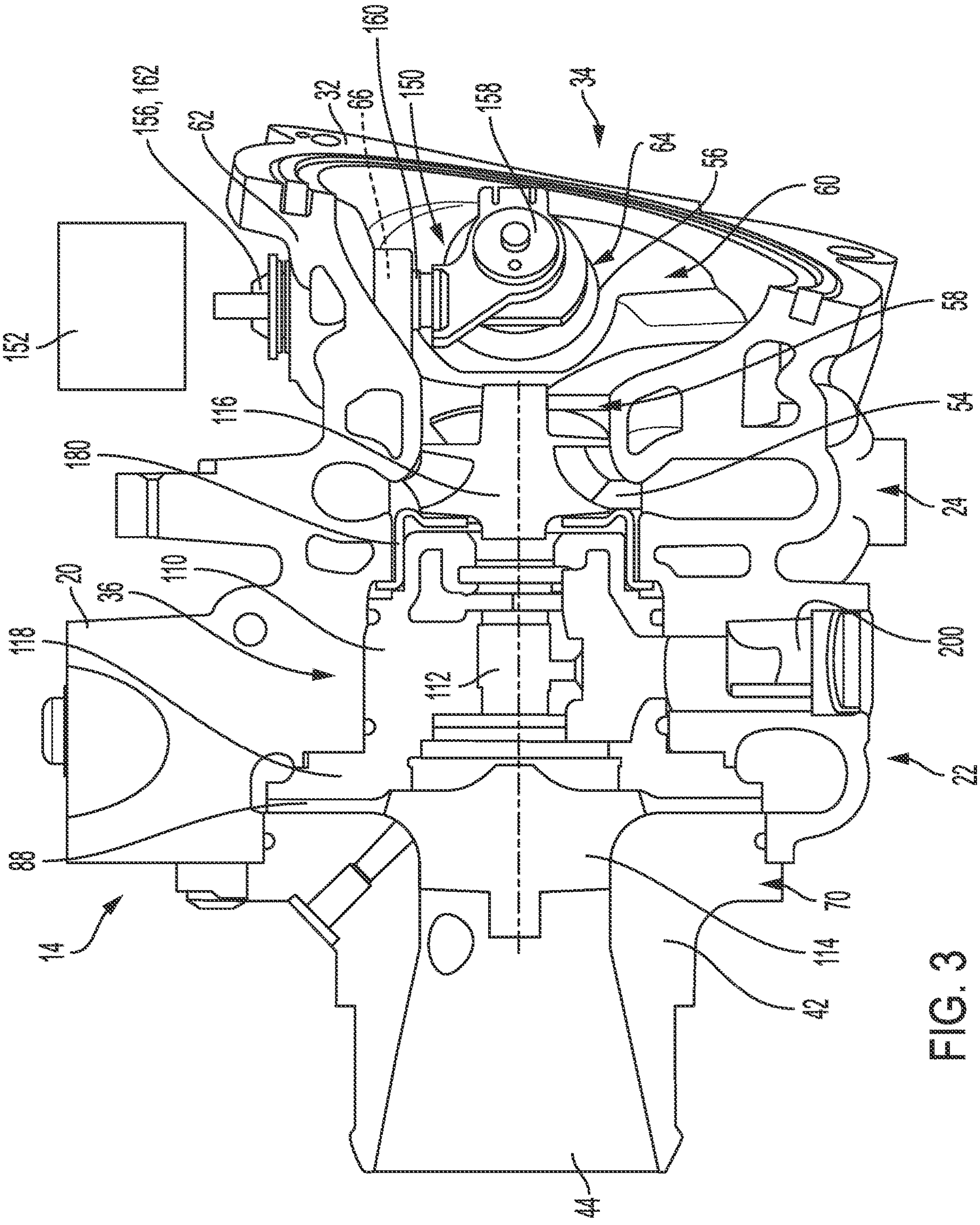
FIG. 3 is cross-sectional view of the integrated turbocharger housing and turbocharger assembly components of FIG. 2, after assembly, in accordance with the principles of the present application.
Figure 6:
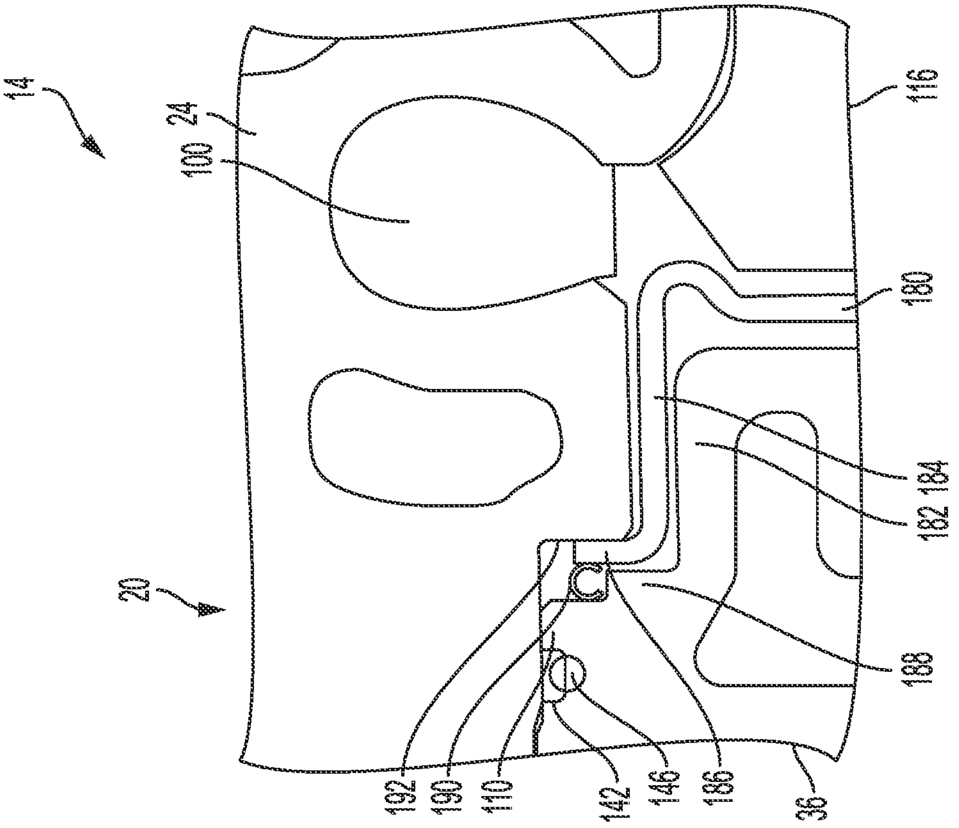
FIG. 6 is an enlarged view of the integrated turbocharger housing shown in FIG. 3, in accordance with the principles of the present application.
Figure 5:
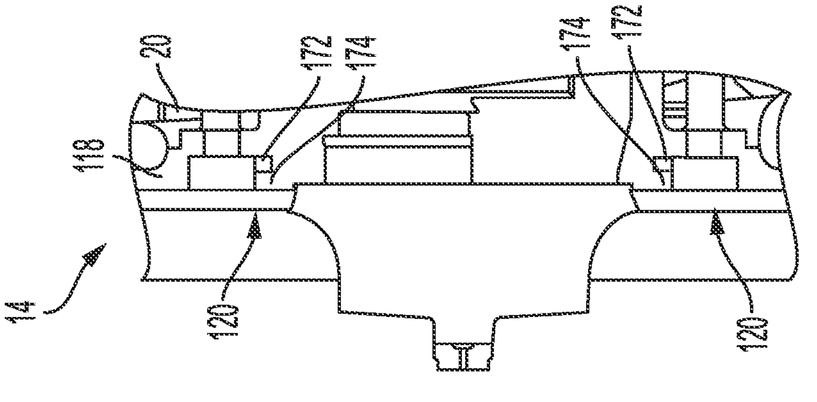
FIG. 5 is a cross-sectional view of a portion of an example cartridge assembly shown in FIG. 3, in accordance with the principles of the present application.
Figure 8:
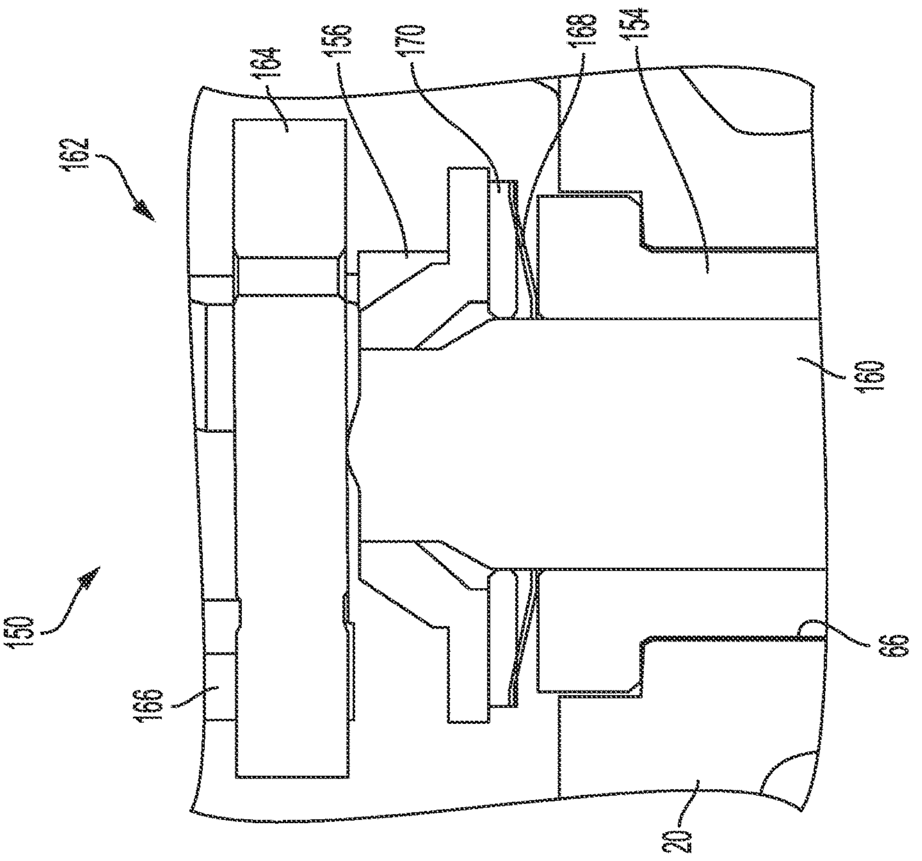
FIG. 8 is a cross-sectional view of an example wastegate valve assembly shown in FIG. 2, in accordance with the principles of the present application.
Figure 7:
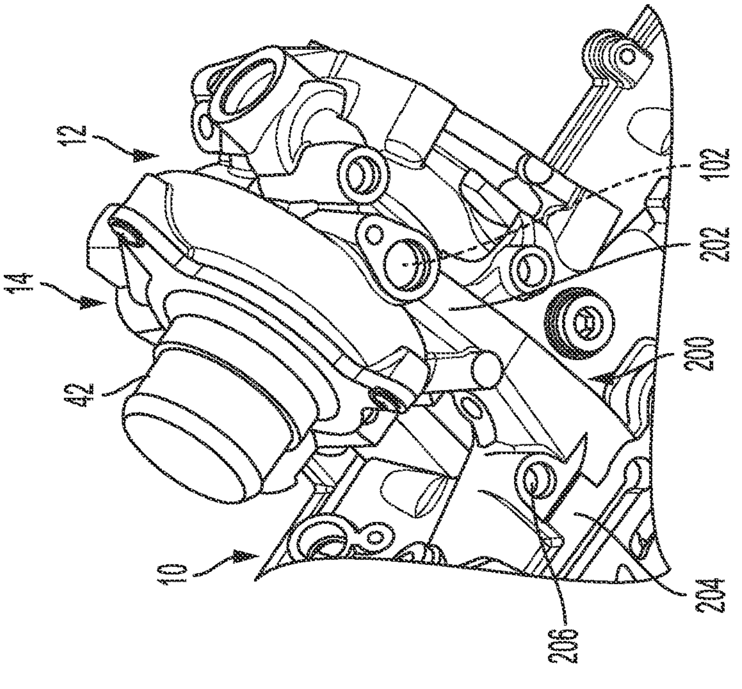
FIG. 7 is a perspective view of the turbocharger housing of FIG. 3 showing an example integrated oil drain passage formed in the integrally cast cylinder head and turbocharger housing, in accordance with the principles of the present application.

With reference to FIGS. 1 and 2, an example cylinder head for an internal combustion engine is shown and indicated at reference numeral 10. In the example embodiment, the cylinder head 10 includes an integrated (cast-in) turbocharger housing 12 that makes up part of a turbocharger assembly 14 (see FIGS. 2 and 3). The integrated cylinder head and turbocharger housing includes multiple unique features. For example, FIG. 3 illustrates a sealing arrangement for a compressor cover, a compressor volute formed by multiple surrounding components, the compressor volute having a unique narrowed/squashed cross-sectional shape, an integrally cast oil drain arranged perpendicular to a turbocharger shaft axis, and a radially offset cartridge assembly sealing arrangement. FIG. 5 illustrates undercut bolt counterbores. FIG. 6 illustrates a PIA metal exhaust seal to the cartridge assembly. FIG. 7 illustrates an integrally cast oil passage in the cylinder head 10 and turbocharger housing 12. FIG. 8 illustrates a wear resistant coupling for the wastegate system 16.

With reference now to FIGS. 1-3, the turbocharger assembly 14 will be described in more detail. In the example embodiment the turbocharger housing 12 is cast with the cylinder head 10 and generally includes a main housing 20 made up of a compressor housing 22 and a turbine housing 24. The main housing 20 defines a cartridge bore 26, a cartridge inlet flange 28 defining a cartridge opening 30, and an outlet flange 32 defining an exhaust outlet 34. The cartridge bore 26 is configured to receive a turbocharger cartridge assembly 36 (FIG. 2), which is configured to align with a drain hole 38 (FIGS. 1 and 3) for draining a lubricant (e.g., oil) supplied to bearings of the cartridge assembly 36 via a lubricant supply port 40 (FIG. 2) formed in the turbocharger housing 12.

As described herein in more detail, the cartridge opening 30 is configured to receive cartridge assembly 36 therein, followed by a compressor cover 42, which defines a compressor inlet 44, as shown in FIG. 2. The compressor inlet 44 is fluidly coupled to a compressor outlet 46 of a compressor outlet duct 48, which is configured to provide compressed intake air to an intake manifold of the engine (not shown).

In the example embodiment, the turbocharger housing 12 includes an integrated (cast-in) turbine inlet duct 50 and wastegate inlet duct 52 (FIG. 1), which are respectively coupled to a turbine inlet 54 and a wastegate inlet 56 (FIG. 3). The turbine inlet 54 is configured to receive exhaust gas from an exhaust manifold of the engine (not shown), and direct the exhaust gas through a turbine outlet 58 formed in the turbocharger housing 12. As shown in FIG. 3, the turbine outlet 58 is configured to supply exhaust from the turbine of the cartridge assembly 36 to a wastegate chamber 60 defined by a wastegate housing 62 of the turbocharger housing 12. The exhaust from the wastegate chamber 60 is then supplied via exhaust outlet 34 to an exhaust system of the vehicle (not shown). As described herein in more detail, the wastegate housing 62 defines a valve seat 64 including the wastegate inlet 56, and a wastegate actuator bore 66.

With reference now to FIGS. 2 and 3, the cartridge assembly 36 will be described in more detail. In the example embodiment, the cartridge assembly 36 generally includes a cartridge housing 110 having one or more bearings (not shown) rotatably supporting a shaft 112 that couples a compressor wheel 114 and a turbine wheel 116. The compressor end of the cartridge housing 110 includes a diffuser flange 118 having a plurality of circumferentially located apertures 120 configured to align with corresponding apertures 122 (FIG. 1) formed on the cartridge inlet flange 28. A plurality of fasteners 124 (FIG. 2) are inserted through apertures 120, 122 to thereby couple cartridge assembly 36 to the turbocharger housing 12. Once coupled, the turbine wheel 116 is disposed at least partially within the turbine outlet 58.

As shown in FIG. 2, in the example implementation, the compressor housing 22 includes a front face 130 having a plurality of apertures 132 configured to align with corresponding apertures 134 formed on the compressor cover 42. A plurality of fasteners 136 (FIG. 2) are inserted through apertures 132, 134 to thereby couple compressor cover 42 to the turbocharger housing 12. As previously described, compressor cover 42 defines compressor inlet 44, which is configured to receive ambient air from an air intake (not shown) and supply the intake air to compressor wheel 114 for subsequent compression. The resulting compressed charge air is then directed to the engine intake manifold via compressor housing outlet 46.

With reference now to FIGS. 2 and 3, the wastegate system 16 will be describe in more detail. In the example embodiment, wastegate system 16 generally includes a wastegate valve assembly 150 and a wastegate valve actuator assembly 152 (shown schematically). The wastegate valve assembly 150 and the wastegate valve actuator assembly 152 are coupled to the integrated turbocharger housing 12, which as noted above, includes the wastegate housing 62 that defines wastegate chamber 60, valve seat 64 with wastegate inlet 56, wastegate actuator bore 66.

In the example embodiment, the wastegate valve assembly 150 generally includes a bushing 154, a coupling 156, and a wastegate valve 158. The bushing 154 is inserted through the wastegate actuator bore 66 and includes an upper end configured to couple to the coupling 156, and a lower end configured to receive and couple to a shaft 160 of the wastegate valve 158. In one example, the shaft 160 is splined to the bushing 154, however it will be appreciated that various couplings are envisioned.

Moreover, in the illustrated example, the coupling 156 is one side of an Oldham coupling 162, which includes an intermediate member 164 disposed between first coupling 156 and a second coupling 166 of the wastegate valve actuator assembly 152 (see FIG. 8). In this way, the Oldham coupling 162 is configured to operably couple the wastegate valve actuator assembly 152 to the wastegate valve assembly 150. However, it will be appreciated that wastegate system 16 may have any suitable coupling between the wastegate valve actuator assembly 152 and the wastegate valve assembly 150 that enables system 16 to function as described herein.

In the example embodiment, the wastegate valve actuator assembly 152 is a direct drive actuator (e.g., motor) positioned to directly drive the wastegate valve 158 via an output shaft (not shown) to selectively open and close the wastegate inlet 56 by selectively seating the wastegate valve 158 against the wastegate valve seat 64.

Figure 4:
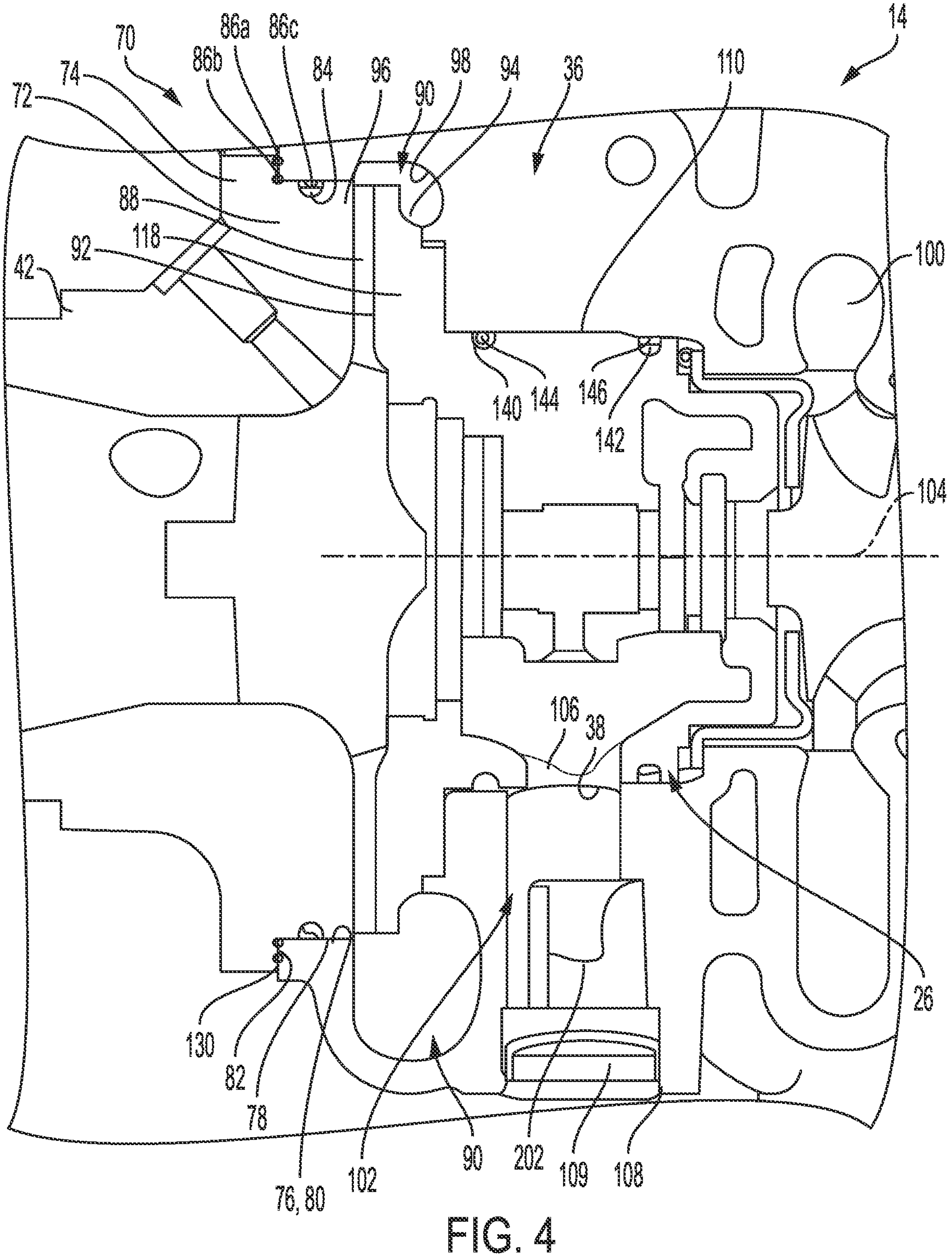
FIG. 4 is an enlarged view of the integrated turbocharger housing and turbocharger assembly components of FIG. 3, in accordance with the principles of the present application.

With reference now to FIG. 4, unique features of the turbocharger housing 12 and cartridge assembly 36 will be described in more detail. A first feature includes a sealing arrangement between the compressor cover 42 and the compressor housing 22. In the example embodiment, the compressor cover 42 includes compressor inlet 44 and an opposite insert end 70, which includes a rounded insert or hub 72 with a rounded backing flange 74. The hub 72 is configured to be received within an inlet opening 76 formed in the compressor housing 22 such that an outer surface 78 of the hub 72 is seated against an inner surface 80 of the inlet opening 76, and an inner surface 82 of the backing flange 74 is seated against the compressor housing front face 130.

In order to establish the sealing arrangement, a recess 84 (only one shown) is formed in the hub outer surface 78 and/or the backing flange inner surface 82, and a seal 86 (e.g., O-ring) is positioned therein. A first sealing arrangement includes a seal **86*a* positioned between the backing flange inner surface 82 and the housing front face 130 to provide an axial sealing arrangement. A second sealing arrangement includes a seal 86*b* positioned in the corner of the intersection between the hub outer surface 78 and the backing flange inner surface 82 to provide a radial-axial sealing arrangement with the turbocharger housing 12. A third sealing arrangement includes a seal 86*c* positioned between the hub outer surface 78 and the inlet opening inner surface 80 to provide a radial sealing arrangement therewith. It will be appreciated that one or more of the described sealing arrangements may be utilized with compressor cover 42. In this way, the various compressor cover 42 sealing arrangements are configured to create and enclose a diffuser passage 88** of the compressor.

With continued reference to FIG. 4, a second feature of the system includes forming the diffuser passage 88 and a compressor volute 90 with the compressor housing 22, the cartridge assembly 36, and the compressor cover 42. In the example embodiment, the cartridge assembly 36 includes diffuser flange 118, which includes a front surface 92 opposite of a contoured volute surface 94. As illustrated, the front diffuser surface 92 defines the diffuser passage 88 along with a rear surface 96 of the compressor cover 42. Additionally, the contoured volute surface 94 is contoured so as to partially define the compressor volute 90 along with a contoured inner surface 98 of the compressor housing 22. As such, the diffuser flange 118 is configured to complete the rest of the volute cross-section as well as form part of the diffuser passage 88. This arrangement advantageously allows the compressor volute 90 to be cast (e.g., sand cast) as part of the core containing the cartridge bore 26, turbine volute 100, and exhaust ports (e.g., exhaust outlet 34) by providing a gap in the compressor housing 22 to remove the volute shape before installing the cartridge assembly 36.

With continued reference to FIG. 4, a third feature of the system includes casting the turbocharger housing 12 with a narrowed/squashed compressor volute 90, which allows greater packaging advantages over conventional D-shaped and O-shaped compressor volute cross-sections. With most bearing shaft lengths, it would be difficult to package a necessary oil drain diameter between both the compressor and turbine volutes 90, 100 and water jackets (not shown). Forming this oblong shape by elongating the volute in the radial direction and shortening the volute in the axial direction allows for a shorter turbocharger housing 12, which provides more packaging space.

With continued reference to FIG. 4, a fourth feature of the system includes the turbocharger housing 12 formed with a straight oil drain passage 102 oriented perpendicular to a rotational axis 104 of the turbocharger shaft 112. At a first end, the straight oil drain passage 102 includes drain hole 38, which opens into the cartridge bore 26. The cartridge assembly 36 includes a drain port 106 configured to be aligned with the drain hole 38 such that lubricant can drain thereto. An opposite second end of the straight oil drain passage 102 includes an opening 108 located on the outer surface of the turbocharger housing 12. This opening 108 is configured to removably receive a plug 109 for selective sealing of the second end of the straight oil drain passage 102. Advantageously, with the plug 109 is removed, the straight oil drain passage 102 provides an optimal straight line of sight for a leak checking device (not shown) to be inserted therein. Additionally, as described herein in more detail, the straight oil drain passage 102 is fluidly connected to an oil return passage 202 configured to return the drained lubricant to the cylinder head 10.

With continued reference to FIG. 4, a fifth feature of the system includes radially offset seals (e.g., O-rings) for sealing between the cartridge assembly 36 and the turbocharger housing 12 within the cartridge bore 26. In the example embodiment, the bearing housing of cartridge assembly 36 is not a smooth, straight cylinder, but rather has a narrowing or step feature. Thus, a width or diameter of the cartridge housing 110 narrows as it extends from the compressor side to the turbine side. The outer surface of the cartridge housing 110 includes a first or compressor side seal groove 140 and a second or turbine side seal groove 142 formed therein. As shown, the first seal groove 140 is located toward the compressor side and receives a first seal 144, and the second seal groove 142 is located toward the turbine side and receives a second seal 146. Due to the sloping or stepped outer surface of the cartridge housing 110, the second seal 146 necessarily has a smaller diameter than the first seal 144. This diameter reduction prevents the second seal 146 from being damaged (e.g., cut) as it passes over the straight oil drain passage 102 during installation. Otherwise, the interference fit second seal 146 could potentially sit proud of the sharp cross drill and be damaged, potentially causing a leak.

With reference now to FIG. 5, a sixth feature of the system enables automated installation or removal of the cartridge assembly 36 into/from the cartridge bore 26. As previously described, the compressor end of the cartridge housing 110 includes the diffuser flange 118 with a plurality of circumferentially located apertures 120 to receive fasteners 124 for coupling cartridge assembly 36 to the turbocharger housing 12. In the example embodiment, the apertures 120 are counterbores formed with an undercut 172 at the bolt head, which provides a grab ledge 174. In this way, with the fasteners 124 removed, a tool (e.g., automation fingers, not shown) can be inserted into the apertures 120 and hook onto the grab ledge 174 to easily manipulate the cartridge assembly 36 during automated-assist installation/removal of the cartridge assembly 36 into/from the turbocharger housing 12.

With reference now to FIGS. 3 and 6, a seventh feature of the system provides a part-in-assembly rigid exhaust seal to the cartridge assembly 36. In the illustrated example, a cup-like heat shield 180 is fitted to the turbine side end of cartridge assembly housing 110 about a first step 182. The heat shield 180 includes a sidewall 184 with a flange 186 extending radially outward therefrom. The flange 186 extends radially beyond a second step 188 formed in the cartridge assembly housing 110, and a rigid (e.g., metal) exhaust seal 190 is interferingly positioned on the second step 188 between the flange 186 and the housing 110. In some examples, the exhaust seal 190 is a C-ring, a V-ring, a Z-ring, or an O-seal, but it will be appreciated that exhaust seal 190 may have other configurations.

In the example embodiment, when the cartridge assembly 36 is inserted in and fastened to the turbocharger housing 12, the flange 186 presses against a back wall 192 (FIG. 6) of the cartridge bore 26 and crushes the rigid exhaust seal 190 between the heat shield flange 186 and cartridge assembly housing 110. This seal is configured to prevent exhaust gas from reaching and deteriorating the radial seals 144, 146 of the cartridge assembly 36. In the example embodiment, exhaust seal 190 is advantageously designed Part-In-Assembly and disposed between the cartridge assembly housing 110 and heat shield 180 to prevent extra assembly steps and eliminate misalignment risk.

Turning now to FIGS. 1, 3, and 7, an eighth feature of the system provides an oil drain passage integrally cast into the cylinder head 10 and turbocharger housing 12. In the example embodiment, an integrated oil passage 200 is created via casting core, which includes and connects the straight oil drain passage 102 and oil return passage 202 to a bottom face 204 of the cylinder head 10. The integrated oil passage 200 mates with an oil drain passage 206 configured to return lubricant to the cylinder block (not shown). This arrangement advantageously reduces the number of component sealing joints, eliminates an external oil drain tube from the turbocharger area to the block, thereby reducing cost and complexity.

Turning now to FIG. 8, and with additional reference to FIGS. 2 and 3, a ninth feature of the system provides the wastegate Oldham coupling 162 with reduced wear and prolonged part life. In the example embodiment, and as noted above, the wastegate valve assembly 150 includes bushing 154, coupling 156, and wastegate valve shaft 160. The bushing 154 is inserted through the wastegate actuator bore 66 and receives valve shaft 160. The Oldham coupling 162 includes the intermediate member 164 disposed between the first coupling 156 and the second coupling 166 (of the wastegate valve actuator assembly 152). In this way, the Oldham coupling 162 is configured to operably couple the wastegate valve actuator assembly 152 to the wastegate valve assembly 150. Moreover, the Oldham coupling 162 configured to partially thermally decouple or reduce conductive heat transfer from wastegate valve shaft 160 to a wastegate actuator motor shaft (not shown), which is operably coupled to the second coupling 166.

In the example illustrated in FIG. 8, a Belleville-style cup spring 168 is utilized to facilitate preventing emissions leakage through the clearance between the valve shaft 160 and bushing 154. As the first coupling 156 rotates about the valve shaft axis, it may experience concentrated wear if in direct contact with the cup spring 168, which would remain predominantly stationary under operation. However, a wear washer 170 is advantageously employed between the cup spring 168 and the first coupling 156 to facilitate preventing concentrated wear thereof and potential damage to the first coupling 156. In this way, the Oldham coupling 162 creates a large distributive wear surface to prolong part life.

Described herein are systems and methods for a cylinder head cast integrally cast with a turbocharger housing that includes (i) a compressor cover with radial, axial, or radial-axial sealing O-ring, (ii) a cartridge assembly diffuser flange with a volute contour, (iii) a narrowed/squashed compressor volute, (iv) a straight oil drain passage oriented perpendicular to a turbocharger shaft axis, (v) radially offset cartridge assembly seals, (vi) undercut bolt counterbores to assist automated cartridge assembly install/removal, (vii) a part-in-assembly (PIA) exhaust seal to the cartridge assembly, (viii) an integrated oil drain passage, and (ix) a reduced wear wastegate actuator coupling.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A cylinder head assembly for an internal combustion engine, the assembly comprising:

a cast cylinder head;

a turbocharger housing, including a compressor housing and turbine housing, integrally cast with the cylinder head;

a turbocharger cartridge assembly configured to be inserted into the turbocharger housing and including a shaft coupled between a compressor wheel and a turbine wheel; and a compressor cover configured to couple to the compressor housing and define a compressor inlet and at least partially define a compressor diffuser passage;

wherein the cartridge assembly includes a housing having a diffuser flange extending outwardly therefrom, the diffuser flange including a front surface and an opposite contoured volute surface, wherein the compressor diffuser passage is at least partially defined by the compressor cover and the diffuser flange front surface, and wherein a compressor volute is at least partially defined by the diffuser flange contoured volute surface and a contoured inner surface of the compressor housing.

2. The cylinder head assembly of claim 1, wherein the compressor cover includes an insert end opposite the compressor inlet, the insert end including a hub with a backing flange, wherein the hub is received within an inlet opening formed in the compressor housing such that an outer surface of the hub is seated against an inner surface of the inlet opening, wherein an inner surface of the backing flange is seated against a front face of the compressor housing, wherein a recess is formed in at least one of the hub outer surface and the backing flange inner surface, and wherein a seal is disposed in the recess to radially and/or axially seal the compressor cover to the compressor housing to thereby at least partially enclose the compressor diffuser passage.

3. The cylinder head assembly of claim 1, wherein the compressor volute has a cross-sectional shape that is squashed compared to a conventional D-shaped or O-shaped volute cross-sections, the cross-sectional shape having an oblong shape that is elongated in a radial direction and shortened in an axial direction to thereby enable a shorter length of the turbocharger housing.

4. The cylinder head assembly of claim 1, wherein the turbocharger housing further comprises:

a cartridge bore configured to receive the cartridge assembly; and a straight oil drain passage in fluid communication with the cartridge bore and configured to receive lubricant from the cartridge assembly, wherein the straight oil drain passage is oriented perpendicular to a rotational axis of the shaft to provide a straight line of sight for a leak checking device.

5. The cylinder head assembly of claim 1, wherein the cartridge assembly further comprises:

the housing having a first seal groove and a second seal groove;

a first seal disposed in the first seal groove and configured to provide a seal between the cartridge assembly housing and the turbocharger housing; and a second seal disposed in the second seal groove and configured to provide a seal between the cartridge assembly housing and the turbocharger housing, wherein the second seal has a diameter smaller than the first seal to enable the second seal to pass over an oil drain passage during installation of the cartridge assembly into the turbocharger housing.

6. The cylinder head assembly of claim 1, wherein the cartridge assembly further comprises one or more apertures formed through the diffuser flange configured to receive a fastener for coupling the cartridge assembly to the turbocharger housing, wherein the one or more apertures each include a counterbore formed with an undercut that provides a grab ledge, and wherein an automated tool can be inserted into the one or more apertures and hook onto the grab ledge to facilitate installation and/or removal of the cartridge assembly.

7. The cylinder head assembly of claim 1, further comprising:

a heat shield configured to be fitted to a turbine side of the cartridge assembly; and a part-in-assembly rigid exhaust seal disposed between the cartridge assembly and the heat shield, wherein when the cartridge assembly is coupled to the turbocharger housing the rigid exhaust seal is configured to be at least partially crushed to establish a seal between the heat shield and the cartridge assembly to prevent exhaust gas from reaching radial seals of the cartridge assembly.

8. The cylinder head assembly of claim 1, further comprising an oil passage integrally cast in the cylinder head and turbocharger housing, the oil passage configured to drain lubricant from the turbocharger housing and direct the lubricant to the cylinder head for return to a cylinder block without any external oil drain tubes.

9. A cylinder head assembly for an internal combustion engine, the assembly comprising:

a cast cylinder head;

a turbocharger housing, including a compressor housing and turbine housing, integrally cast with the cylinder head;

a turbocharger cartridge assembly configured to be inserted into the turbocharger housing and including a shaft coupled between a compressor wheel and a turbine wheel;

a compressor cover configured to couple to the compressor housing and define a compressor inlet and at least partially define a compressor diffuser passage;

wherein the cartridge assembly includes a housing having a diffuser flange extending outwardly therefrom, the diffuser flange including a front surface and an opposite contoured volute surface, wherein the compressor diffuser passage is at least partially defined by the compressor cover and the diffuser flange front surface, and wherein a compressor volute is at least partially defined by the diffuser flange contoured volute surface and a contoured inner surface of the compressor housing; and a wastegate valve assembly having:

a bushing configured to be received within a bore formed in the turbocharger housing;

a valve shaft received within the bushing;

an Oldham coupling operably coupled to the valve shaft;

a cup spring disposed about the valve shaft to facilitate preventing emissions leakage through a clearance between the valve shaft and the bushing; and a wear washer disposed about the valve shaft between the cup spring and the Oldham coupling to facilitate preventing concentrated wear of the Oldham coupling.

10. The cylinder head assembly of claim 9, further comprising a wastegate valve actuator assembly operably coupled to the Oldham coupling to selectively move a wastegate valve between open and closed positions.

11. The cylinder head assembly of claim 10, wherein the wastegate valve actuator assembly includes a direct drive motor having an output shaft coupled to the shaft of the wastegate valve.

12. A cylinder head assembly for an internal combustion engine, the assembly comprising:

a cast cylinder head;

a turbocharger housing, including a compressor housing and turbine housing, integrally cast with the cylinder head;

a turbocharger cartridge assembly configured to be inserted into the turbocharger housing and including a shaft coupled between a compressor wheel and a turbine wheel;

a compressor cover configured to couple to the compressor housing and including a compressor inlet and an opposite insert end with a hub and a backing flange, wherein a recess is formed in the hub and/or the backing flange to receive a first seal to radially and/or axially seal the compressor cover to the compressor housing;

wherein the cartridge assembly includes a housing having a diffuser flange extending outwardly therefrom, the diffuser flange including a front surface and an opposite contoured volute surface, wherein a compressor diffuser passage is at least partially defined by the compressor cover and the diffuser flange front surface, and wherein a compressor volute is at least partially defined by the diffuser flange contoured volute surface and a contoured inner surface of the compressor housing;

wherein the compressor volute has a cross-sectional shape that is squashed compared to a conventional D-shaped or O-shaped volute cross-sections, the cross-sectional shape having an oblong shape that is elongated in a radial direction and shortened in an axial direction to thereby enable a shorter length of the turbocharger housing;

a straight oil drain passage in fluid communication with a cartridge bore of the turbocharger housing and configured to receive lubricant from the cartridge assembly, wherein the straight oil drain passage is oriented perpendicular to a rotational axis of the shaft to provide a straight line of sight for a leak checking device;

a first seal groove and a second seal groove formed in the cartridge assembly housing;

a second seal disposed in the first seal groove and configured to provide a seal between the cartridge assembly housing and the turbocharger housing; and a third seal disposed in the second seal groove and configured to provide a seal between the cartridge assembly housing and the turbocharger housing, wherein the third seal has a diameter smaller than the second seal to enable the second seal to pass over the straight oil drain passage during installation of the cartridge assembly into the turbocharger housing;

wherein the cartridge assembly further includes one or more apertures formed through the diffuser flange configured to receive a fastener for coupling the cartridge assembly to the turbocharger housing, wherein the one or more apertures each include a counterbore formed with an undercut that provides a grab ledge, and wherein an automated tool can be inserted into the one or more apertures and hook onto the grab ledge to facilitate installation and/or removal of the cartridge assembly;

a heat shield configured to be fitted to a turbine side of the cartridge assembly, and a part-in-assembly rigid exhaust seal disposed between the cartridge assembly and the heat shield, wherein when the cartridge assembly is coupled to the turbocharger housing the rigid exhaust seal is configured to be at least partially crushed to establish a seal between the heat shield and the cartridge assembly to prevent exhaust gas from reaching radial seals of the cartridge assembly;

an oil passage integrally cast in the cylinder head and turbocharger housing, the oil passage configured to drain lubricant from the turbocharger housing and direct the lubricant to the cylinder head for return to a cylinder block without any external oil drain tubes; and a wastegate valve assembly comprising:

a bushing configured to be received within a bore formed in the turbocharger housing;

a valve shaft received within the bushing;

an Oldham coupling operably coupled to the valve shaft;

a cup spring disposed about the valve shaft to facilitate preventing emissions leakage through a clearance between the valve shaft and the bushing; and a wear washer disposed about the valve shaft between the cup spring and the Oldham coupling to facilitate preventing concentrated wear of the Oldham coupling.

* * * * *